United States Patent
Watanabe et al.

(10) Patent No.: US 6,437,299 B1
(45) Date of Patent: Aug. 20, 2002

(54) HEATING APPARATUS FOR SPLICE PROTECTOR WITH SEPARATE HEATING CONDUCTOR PATTERNS

(75) Inventors: Tsutomu Watanabe; Kenichi Torii, both of Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/605,419

(22) Filed: Jun. 27, 2000

(30) Foreign Application Priority Data

Jun. 29, 1999 (JP) ............................. 11-182779

(51) Int. Cl.$^7$ ............................................. G02B 6/255
(52) U.S. Cl. ................... 219/478; 219/480; 219/544; 219/466.1; 219/468.1; 392/432; 385/99; 385/134
(58) Field of Search ................. 219/478, 479, 219/480, 539, 543, 544, 466.1, 468.1, 255, 508, 462.1; 338/306–309, 260; 392/435, 439, 432; 385/95–96, 99, 134

(56) References Cited

U.S. PATENT DOCUMENTS

| | | | |
|---|---|---|---|
| 2,878,357 A | * 3/1959 | Thomson | 219/203 |
| 3,475,588 A | * 10/1969 | McMaster | 219/203 |
| 4,460,820 A | 7/1984 | Matsumoto et al. | |
| 5,331,134 A | * 7/1994 | Kimura | 219/543 |
| 5,396,047 A | * 3/1995 | Schilling et al. | 219/486 |
| 6,080,970 A | * 6/2000 | Yoshida et al. | 219/444.1 |

FOREIGN PATENT DOCUMENTS

| | | | |
|---|---|---|---|
| CH | 122021 | * | 8/1927 |
| DE | 3513157 | * | 10/1986 |
| EP | 89383 | * | 9/1983 |
| EP | 1089593 | * | 4/2001 |
| JP | 3-295185 | * | 12/1991 |
| JP | 4-20721 | * | 1/1992 |
| JP | 2001-217060 | * | 8/2001 |

* cited by examiner

*Primary Examiner*—John A. Jeffery
(74) *Attorney, Agent, or Firm*—McDermott, Will & Emery

(57) ABSTRACT

A heating apparatus includes a heater 6 which includes a first heating conductor pattern 1, a second heating conductor patterns 2 and an elongated plate-shaped member 3 made of heat-resistive and insulated material. The first heating conductor pattern 1 is disposed in the central portion in a longitudinal direction of the plate-shaped member 3. The second heating conductor patterns are disposed in both end portions of the plate-shaped member in the longitudinal direction. The first heating conductor pattern 1 and the second heating conductor patterns 2 are independently controlled their temperature. Current is first fed to the first heating conductor pattern 1, and the current feeding is stopped, and current is then fed to the second heating conductor patterns 2. Accordingly, the protective member placed on and along the heater 6 is gradually heated from the center to both ends.

14 Claims, 8 Drawing Sheets

HEATING APPARATUS FOR SPLICE PROTECTOR WITH SEPARATE HEATING CONDUCTOR PATTERNS

BACKGROUND OF THE INVENTION

1. Field of the Invention

The present invention relates to an apparatus and a method for heating a protective member for protecting a fusion splicing part of optical fibers.

2. Description of the Related Art

Two coated optical fibers are permanently spliced to each other in such a manner that a coating layer of an end part of each coated optical fiber is removed to expose a vitreous fiber thereof(hereinafter referred to "optical fiber"), and the thus exposed optical fibers are aligned, joined end to end and fusion spliced together. The exposed portion of the optical fibers including the fusion splicing part is covered with a protective member and protected thereby. FIGS. 8 and 9 are diagrams showing protective members each used for the optical fiber fusion splicing part. FIGS. 8A and 9A are transverse sectional views of the protective members, and FIGS. 8B and 9B are longitudinal sectional views of the same.

In FIGS. 8 and 9, reference numerals 10 and 10' represent protective members; 11 and 11', adhesive tubes; 12 and 12', reinforcing members; and 13, a thermal shrinking tube. The protective member 10 of FIG. 8 is applied mainly to a splicing part of the optical fiber ribbon containing a plurality of optical fibers. The protective member 10' of FIG. 9 is applied mainly to a splicing part of a coated optical fiber containing a single optical fiber.

The protective member 10 of FIG. 8 consists of the thermal shrinking tube 13, the adhesive tube 11 and the reinforcing member 12 which is solid semicircular in cross section. The adhesive tube 11 and the reinforcing member 12 are stored in the thermal shrinking tube 13 while the reinforcing member 12 is disposed in parallel to the adhesive tube 11 in a longitudinal direction. The protective member 10' of FIG. 9 consists of the thermal shrinking tube 13, the adhesive tube 11' and the reinforcing member 12' which is solid circular in cross section. The adhesive tube 11' and the reinforcing member 12' are stored in the thermal shrinking tube 13 while the reinforcing member 12' is disposed in parallel to the adhesive tube 11' in a longitudinal direction. The adhesive tubes 11 and 11' are made of adhesive resin, such as ethylene vinyl acrylate. The reinforcing members 12 and 12' are made of material having good heat resistance and a high compressive strength, such as glass ceramic or stainless steel. The thermal shrinking tube 13 is made of irradiated polyethylene, for example.

An optical fiber ribbon containing a plurality of optical fibers is made in such a manner that a plurality of optical fibers are aligned and coated by a coating resin to form a tape-shape. As shown in FIG. 8, the reinforcing member 12 is shaped to be solid semicircle in cross section, and the adhesive tube 11 is shaped to be hollow elliptical in cross section, in order to dispose the optical fiber ribbon thereto easily. However, the adhesive tube 11 may be hollow circular in transverse cross section, since it is soft and easy to be deformable. In the case of a coated optical fiber containing a single optical fiber, the cross section of the coated optical fiber is circular, and hence, there is no need that the reinforcing member 12' should be solid semicircular in cross section. Therefore, as shown in FIG. 9A, the reinforcing member 12' is solid circular in cross section, which makes it easy to manufacture of the reinforcing member, and the adhesive tube 11' is also hollow circular in cross section.

FIG. 10 shows a working procedure to protect an optical fiber fusion splicing part with the thus produced protective member. FIGS. 10A, 10B and 10C are longitudinal sectional views showing the working procedure. In FIG. 10, constituent parts same as those in FIGS. 8 are referenced correspondingly, and their description will be omitted. In FIG. 10, reference numeral 14 represents an optical fiber ribbon; 15, an optical fiber; and 16, a fusion splicing part.

As shown in FIG. 10A, two optical fiber ribbons are spliced to each other in such a manner that a coating layer of an end part of each optical fiber ribbon is removed to expose optical fibers thereof, and the thus exposed optical fibers are aligned, joined end to end and fusion spliced together. The exposed portion of the optical fibers 15 including the fusion splicing part 16 is passed through the adhesive tube 11 of the protective member 10. A plurality of optical fibers 15 are aligned in parallel in the direction vertical to the paper of the drawing. Accordingly, the optical fibers 15 are seen as a single optical fiber in FIG. 10.

Subsequently, the fusion splicing part of the optical fibers, which is covered with the protective member 10, is disposed on a heater of a heating apparatus and heated thereby. By the heating, the adhesive tube 11 is fused, and also the thermal shrinking tube 13 is thermally shrunk. A compressive force of the thermal shrinking tube 13 generated due to thermal shrunk puts the fusion splicing part of the optical fibers adaptively along the reinforcing member 12. The inside of the thermal shrinking tube 13 is filled with the fused adhesive resin of the adhesive tube 11.

FIG. 11 shows an embodiment of a heater of a heating apparatus which is used for heating the protective member. FIG. 11A is a plan view showing the heater, and FIG. 11B is a longitudinal sectional view taken on line X—X in FIG. 11A. FIG. 11C shows a graph of a temperature distribution of the heater. The heater designated by reference numeral 17 is a ceramic heater in which a heating conductive circuit 17a is buried in a narrow ceramic plate 17b. The heater 17 has a temperature distribution configured such that temperature at the center of the heater is high and gradually decreases toward both sides ends of the heater as shown in FIG. 11C. That is, when the heater is operated, the protective member 10 is heated gradually from the center to both side ends.

FIG. 10B shows the protective member when its center is heated. FIG. 10C shows the protective member when the heating reaches both side ends of the protective member. As shown in FIG. 10B, with the heating of the heater, at first, a central portion of the adhesive tube 11 is fused, while the central portion of the thermal shrinking tube 13 shrinks. Subsequently, the phenomena of the fusing of the adhesive tube and the shrinking of the thermal shrinking tube gradually progress toward both side ends of the protective member. Finally, the adhesive tube is fused over the entire length of the protective member and the thermal shrinking tube is also shrunk over the entire length as shown FIG. 10C.

During this process, the phenomenon of fusing of the adhesive tube progresses from the center to both the side ends and therefore air around the central portion of the fusion splicing part of the optical fibers is extruded towards both the side ends of the protective member. If the air is completely extruded from the center to both the side ends, there is no fear that the air around the optical fiber fusion splicing part remains in the form of air bubbles in the adhesive resin.

If the phenomenon of the heating of the protective member does not progress from the center toward both the side ends gradually and the portions near both side ends is heated excessively quickly, the air is not completely extruded to both the side ends and sometimes remains in the form of air bubbles in the adhesive resin. In such a case that air bubbles remain in the vicinity of the optical fiber fusion splicing part, the following problem arises. When the optical fiber fusion splicing part protected by the protective member undergoes a variation of ambient temperature, the air in the bubbles expands and shrinks to generate a bending stress in the optical fiber. This leads to deterioration of the transmission characteristic of the optical fiber. Accordingly, it is important that the protective member is gradually heated from the center to both side ends.

The produce and protection of the optical fiber fusion splicing part described above are carried out by using mainly a fusion splicing apparatus and a heating apparatus for heating the protective member. In general, the heating apparatus, which is assembled to the housing of the fusion splicing apparatus, is used. In order to splice the optical fibers, first of all, the heating apparatus, a stripping tool, a fiber cutting tool, a protective member and the like are transported to a site where coated optical fibers are laid. In the site, the following work is done in the order of removing a coating layer of an end of each optical fiber, cutting the optical fibers, fusion splicing the optical fibers, applying a protective member to the fusion spliced optical fibers, and heating the protective member.

In the heating process of the protective member, a heating apparatus with the above-mentioned heater is used. A portion including the optical fiber fusion splicing part covered with the protective member is laid along the heater and then heated thereby. The adhesive tube stored in the protective member is fused while the thermal shrinking tube is shrunk. Accordingly, the protective member is fixed to the optical fiber fusion splicing part while covering it.

In a usual heating process, work to apply a protective member to an optical fiber fusion splicing part, work to set the protective member in a heating apparatus by laying it along a heater of the heating apparatus, and work to take the heated protective member out of the heating apparatus are all done by manual. During a period from the setting of the object to be heated in the heating apparatus to the taking the heated object out of the apparatus, a control circuit of the heating apparatus automatically performs the operations of feeding current to the heating conductive circuit of the heater, keeping heater temperature, stopping the heating operation after the heater temperature is kept for a predetermined period of time, and cooling it to about ambient temperature.

The period from the setting of the object to be heated in the heating apparatus to the taking the heated object out of the apparatus is needed from 100 to 150 seconds although it depends on a kind of the optical fiber ribbon since the size of the protective member depends on the number of optical fibers of the optical fiber ribbon. A worker for splicing fibers must wait during this period, and can not do any other work during the period. Accordingly, it is required that the time taken for the heating and cooling is as short as possible.

Since the heating apparatus is usually assembled into the housing of the fusion splicing apparatus, an electric power of the heating apparatus is supplied from a power supply which supplies electric power to the fusion splicing apparatus. Therefore, voltage and current must be kept within limits. In the usual fusion splicing apparatus, the voltage that may be used for the heating apparatus is limited within DC 12V and the electric power is within about 32 W. Therefore, resistance of the heater of the heating apparatus is 4.5 Ω in lower limit, and a heater of which resistance is smaller than 4.5 Ω can not be used. Further, the electric power for energizing the heater cannot be further increased in order to reduce the time taken for the heating and cooling.

SUMMARY OF THE INVENTION

Accordingly, an object of the present invention is to provide an apparatus and a method for heating a protective member for protecting a fusion splicing part of optical fibers. The apparatus and method are capable of reducing the time taken for the heating process without increasing the heating power of the heating apparatus.

The above-mentioned object can be achieved by a heating apparatus for heating a protective member for a fusion splicing part of optical fibers. The apparatus comprises a heater including a plate-shaped member which is made of heat-resistive and insulated material and has an elongated shape extending in a longitudinal direction, a first heating conductor pattern disposed in a central portion of the plate-shaped member in the longitudinal direction, and a second heating conductor pattern disposed in both end portions of the plate-shaped member in the longitudinal direction. In the heating apparatus, the first heating conductor pattern and the second heating conductor pattern are independently controlled their temperatures.

In the above-mentioned heating apparatus, it is preferable that the second heating conductor pattern extends from one end portion of the plate-shaped member to the other end portion thereof in the longitudinal direction. It is also preferable that the second heating conductor pattern comprises two heating conductor patterns which are separately disposed in each end portion of the plate-shaped member in the longitudinal direction while being close to an end of the first heating conductor pattern or overlapping with the first heating conductor pattern. The two heating conductor patterns may be preferably disposed symmetrical with respect to the center of the plate-shaped member.

Further, it is preferable that the first and second heat conductor patterns have same resistance value.

Moreover, it is preferable that the plate-shaped member comprises a first plate-shaped member in which the first heating conductor pattern is disposed and a second plate-shaped member in which the second heating conductor pattern is disposed. In such a heater with two plate-shaped members, it is preferable that the first and the second heating conductor patterns are printed on the first and the second plate-shaped members respectively, and the first and second plate-shaped members are arranged in parallel while a spacer is disposed therebetween. It is also preferable that the first and second heating conductor patterns are buried in the first and second plate-shaped members respectively, and the first and second plate-shaped members are combined to form the heater.

Current is first fed to the first heating conductor pattern disposed in the central portion of the heater by use of the heating apparatus of the invention to thereby heat the central portion of a protective member. Since the first heating conductor pattern is small in area and hence its heat capacity is small, temperature in the central portion of the heater quickly rises, so that a temperature rise time is reduced for a fixed consumption of the electric power. Subsequently, the current being fed to the first heating conductor pattern is stopped, and current is fed to the second heating conductor patterns disposed at least in both end portions, to thereby heat both end portions of the protective member. In this case, both end portions are heated by the remaining heat of the first heating conductor pattern and the heat of second heating conductor pattern. Further, since the center of the protective member is not heated excessively while the both end portions of the protective member is heated by the second heating conductor, cooling of the heated object is quick. Accordingly, the whole heating time may be reduced by about 20%.

Further, in the above-mentioned heating apparatus, it is preferable that a first temperature sensor and a second temperature sensor are respectively provided near the first heating conductor pattern and the second heating conductor pattern to detect temperatures thereof, and a control mechanism is provided to control, on the basis of temperatures detected by the first or second temperature sensor respectively, temperatures of the first and second heating conductor patterns separately so that the temperatures of the first and second heating conductor patterns are kept at predetermined temperatures for a predetermined time.

By the control, the phenomena of the fusing of the adhesive tube and the shrinking of the thermal shrinking tube gradually progress toward both side ends of the protective member, from the center thereof. Therefore, there is no fear that the air around the optical fiber fusion splicing part remains in the form of air bubbles in the adhesive resin.

Further, it is preferable that an ambient temperature sensor is attached to a location separated from the heater to such an extent that it is not influenced by the heater temperature, and a control mechanism is provided to control, on the basis of a temperature detected by the ambient temperature sensor, temperatures of the first and second heating conductor patterns so that temperatures of the first and second heating conductor patterns are kept at given values independent of ambient temperature.

A current fed to the heating conductor pattern is controlled in accordance with an ambient temperature detected by the ambient temperature sensor so that heating temperatures of the first and second heating conductor patterns are invariable irrespective of a variation of the ambient temperature. Accordingly, the heating of the protective member is made uniform independent of the ambient temperature.

Moreover, it is preferable that the above-mentioned heating apparatus comprises a heating chamber, clamping member and a cover. With the heating chamber, the heater can be secured. With the cover attached to the heating chamber, it is possible to close the heating chamber to thereby confine the heat within the heating chamber.

Further, the above-mentioned object can be achieved by a method of heating a protective member for protecting a fusion splicing part of optical fibers, the heating method comprising the steps of:

putting a protective member covering with an optical fiber fusion splicing part along a heater, the heater including a plate-shaped member which is made of heat-resistive and insulated material and an elongated shape extending in a longitudinal direction, a first heating conductor pattern disposed in a central portion of the plate-shaped member in the longitudinal direction, and a second heating conductor pattern disposed in both end portions of the plate-shaped member in the longitudinal direction;

heating the first heating conductor pattern to be a predetermined temperature;

keeping the predetermined temperature of the first heating conductor pattern for a predetermined time;

stopping the heating of the first heating conductor pattern;

heating the second heating conductor pattern to be a preset temperature;

keeping the preset temperature of the second heating conductor pattern for a preset time;

stopping the heating of the second heating conductor pattern to return a temperature of the optical fiber fusion splicing part covered with the protective member to ambient temperature.

DETAILED DESCRIPTION OF THE PREFERRED EMBODIMENTS

Figure 1A:
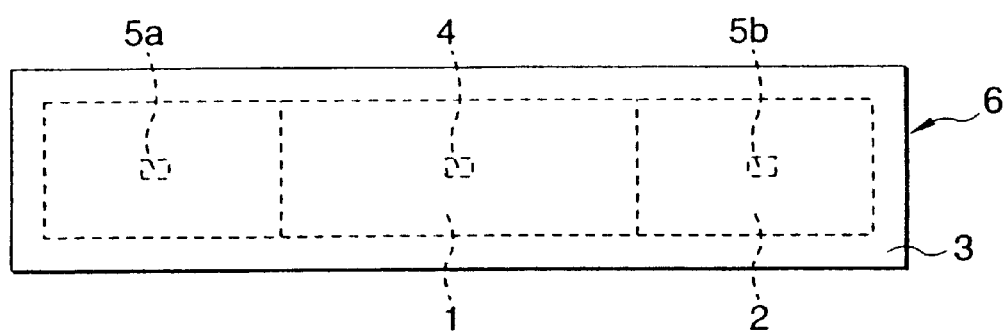
FIG. 1A is a plan view showing a first embodiment of a heater used for a fusion splicing apparatus according to the present invention.
Figure 1B:
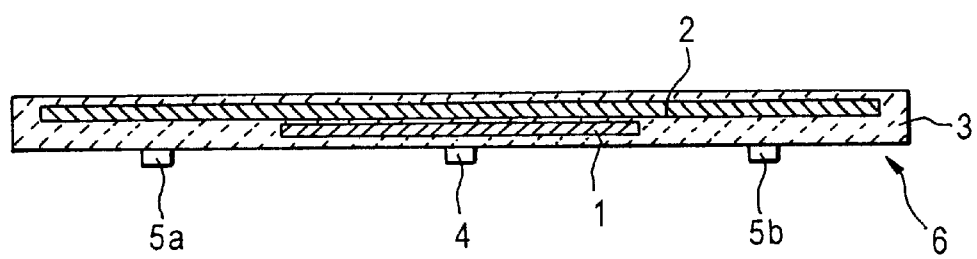
FIG. 1B is a longitudinal sectional view showing the first embodiment of the heater used for the fusion splicing apparatus according to the present invention.

FIGS. 1 and 2 show four types of heaters which are used for a heating apparatus according to the present invention. FIGS. 1A and 2A are plan views showing the heaters, and FIGS. 1B, 2B, 2C and 2D are longitudinal views showing the same. In FIGS. 1 and 2, reference numeral 1 designates a first heating conductor pattern; 2, 2a and 2b, second heating conductor patterns; 3, 3a and 3b a plate-shaped member; 4, a first temperature sensor; 5a and 5b, second temperature sensors; and 6 and 6', heaters. Broken lines indicate arrangements of the first heating conductor pattern 1 or the second heating conductor patterns 2, 2a and 2b as shown in FIGS. 1A and 2A.

The heater 6 shown in FIGS. 1A and 1B is composed of the heating conductor patterns 1 and 2 and the elongated plate-shaped member 3. The heating conductor patterns 1 and 2 are disposed in the plate-shaped member 3, and current may be fed to those individual conductor patterns by way of lead wires (not shown) led out of those conductor patterns. The plate-shaped member 3 is made of heat-resistive and good insulated material, such as ceramic, and is about 70 mm long, about 10 mm wide and about 1 mm thick. The first heating conductor pattern 1 is disposed in the central portion of the plate-shaped member 3, and the second heating conductor pattern 2 is disposed in the substantially entire area of the plate-shaped member 3 including both end portions as shown in FIGS. 1A and 1B. The second heating conductor pattern 2 may be disposed in the entire area of the plate-shaped member 3 while extending both ends of the plate-shaped member 3. The first temperature sensor 4, e.g., a thermistor, is secured to one location within the area of the plate-shaped member 3 within which the first heating conductor pattern 1 is disposed, so as to detect a temperature of the first heating conductor pattern 1. The second temperature sensors 5a and 5b, e.g., thermistors, are secured to two locations within the areas of the plate-shaped member 3 within which the second heating conductor pattern 2 is disposed, so as to detect a temperature of the second heating conductor pattern 2.

Figure 2A:
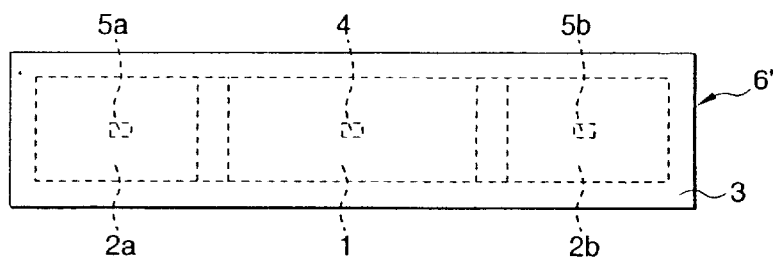
FIG. 2A is a plan view showing a second embodiment of heater used for a fusion splicing apparatus according to the present invention.
Figure 2B:
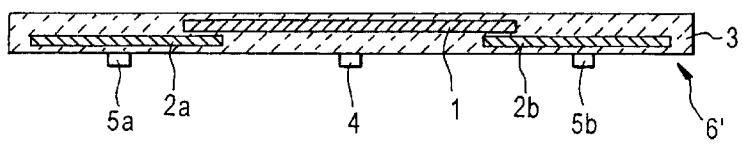
FIG. 2B is a longitudinal sectional view showing the second embodiment of heater used for the fusion splicing apparatus according to the present invention.
Figure 2C:
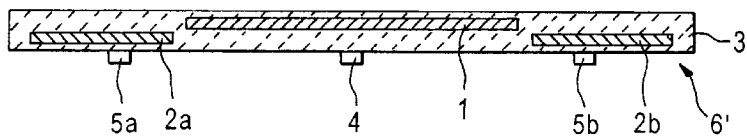
FIG. 2C is a longitudinal sectional view showing the third embodiment of heater used for the fusion splicing apparatus according to the present invention.
Figure 2D:
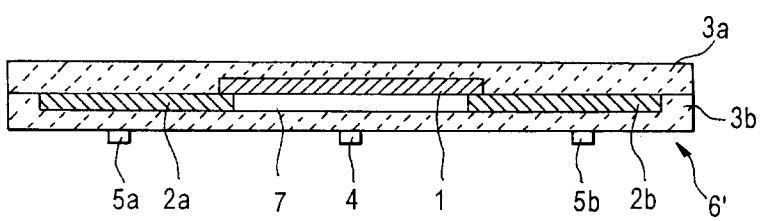
FIG. 2D is a longitudinal sectional view showing the fourth embodiment of heater used for the fusion splicing apparatus according to the present invention.
Figure 2E:
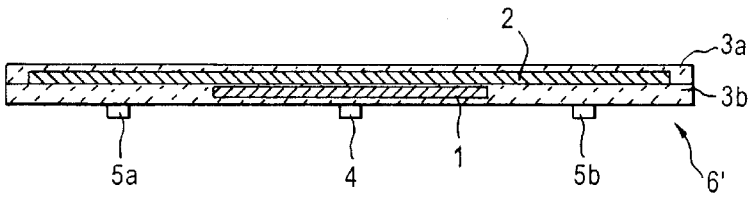
FIG. 2E is a longitudinal sectional view showing the fifth embodiment of heater used for the fusion splicing apparatus according to the present invention.

The heater 6' shown in FIG. 2A and 2B is composed of the first heating conductor pattern 1, the second heating conductor patterns 2a and 2b and the plate-shaped member 3. The first heating conductor pattern 1, and the second heating conductor patterns 2a and 2b are disposed in the plate-shaped member 3 similar to those of the heater 6, and current may be fed to those individual conductor patterns by way of lead wires (not shown) let out of those conductor patterns. The first heating conductor pattern 1 is disposed in the central portion of the plate-shaped member 3. The second heating conductor patterns 2a and 2b are respectively disposed in the areas of the plate-shaped member which are symmetrical with respect to the central portion thereof while including both end portions. The second heating conductor patterns 2a and 2b and the first heating conductor pattern 1 are disposed in an overlapping fashion as shown FIG. 2B. If required, those first and second conductor patterns may be disposed while somewhat separated from each other as shown in FIG. 2C. Such separately disposed them are connected electrically and fed with current through a set of lead wires (not shown) in a series fashion. Further, the second heating conductor patterns 2a and 2b may extend to both ends of the plate-shaped member 3 individually.

The first temperature sensor 4 is secured to one location within the area of the plate-shaped member 3 within which the first heating conductor pattern 1 is disposed, so as to detect the temperature of the first heating conductor pattern 1. The second temperature sensors 5a and 5b are secured to two locations within the areas of the plate-shaped member 3 within which the second heating conductor patterns 2a and 2b are disposed, so as to detect temperatures of the second heating conductor patterns 2a and 2b.

In FIGS. 1 and 2, the second temperature sensors 5a and 5b are secured symmetrically with respect to the center. If required, one temperature sensor may be used instead of two temperature sensors. The second temperature sensors 5a and 5b are disposed apart from the first heating conductor pattern, to thereby lessen the influence of temperature of the first heating conductor pattern. In FIG. 1, the positions of the second temperature sensors 5a and 5b are not center of the second heating conductor pattern 2. However, it is possible to predict a maximum temperature of the second heating conductor pattern 2 on the basis of a temperature at the corresponding sensor position.

In the instance of FIG. 1, the first heating conductor pattern 1 is disposed in the lower part of the plate-shaped member, while the second heating conductor pattern 2 is disposed in the upper part. Even if the first heating conductor pattern 1 is disposed in the upper part and the second heating conductor pattern 2 is disposed in the lower part, the function of the heater containing them is little changed since thickness of the plate-shaped member 3 is about 1 mm. Similarly, in FIG. 2, if required, the first heating conductor pattern 1 may be disposed in the lower part, and the second heating conductor patterns 2a and 2b may be disposed in the lower part.

Further, in FIG. 1 and FIG. 2, it is preferable that a resistance value of the first heating conductor pattern 1 is selected to be equal to that of the second heating conductor pattern 2 or the second heating conductor patterns 2, 2a and 2b, and that those patterns are selectively fed with electric power from the power supply to the fusion splicing apparatus to heat.

Figure 3:
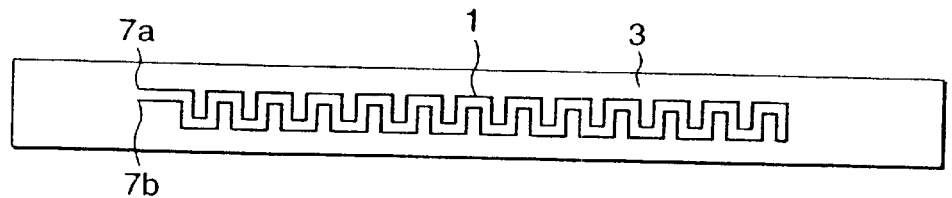
FIG. 3 is a plan view showing an embodiment of a circuit pattern of a heating conductor pattern according to the invention.

FIG. 3 is a diagram showing a circuit pattern of the first heating conductor pattern 1. The first heating conductor pattern 1 consists of a circuit pattern configured like a combination of letters U as shown in FIG. 3. The circuit is secured in the plate-shaped member 3 made of ceramic, for example. Lead wires 7a and 7b are led out of the circuit, for feeding current. The circuit pattern is not limited to that of the FIG. 3, but may take any pattern if it is able to provide a predetermined resistance required for the conductor circuit. Such a circuit pattern may be formed in a manner that one of the surfaces of a thin ceramic plate is coated with conductive coating, a circuit pattern is printed thereon to form a conductor circuit, lead wires are connected thereto, and finally another ceramic plate is laminated thereon while covering the conductor circuit.

In the heaters shown in FIGS. 1A through 2C, the first and second heating conductor patterns are buried in one plate-shaped member. If required, the first heating conductor pattern may be buried into a plate-shaped member, and the second heating conductor pattern or patterns may be buried in another plate-shaped member. In this case, the first heating conductor pattern is printed on a top surface of one plate-shaped member, and the second heating conductor pattern or patterns are printed on a top surface of another plate-shaped member. Those plate-shaped members 3a, 3b printed the conductor patterns 1, 2a, 2b are arranged in parallel in a state that the printing surface of those members are confronted with each other while a spacer 7 is disposed therebetween as shown in FIG. 2D, so that they are used as heater in the heating apparatus according to the present invention although two heating conductor patterns are not buried into plate-shaped member or members. As a matter of course, two plate-shaped members 3a, 3b containing the first and second heating conductor patterns 1, 2 may be combined to form a heater 6' as shown in FIG. 2E.

Figure 4A:
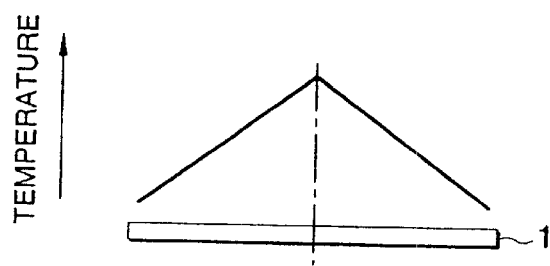
FIG. 4A is a graph showing a heating temperature distribution for a first heating conductor pattern.
Figure 4B:
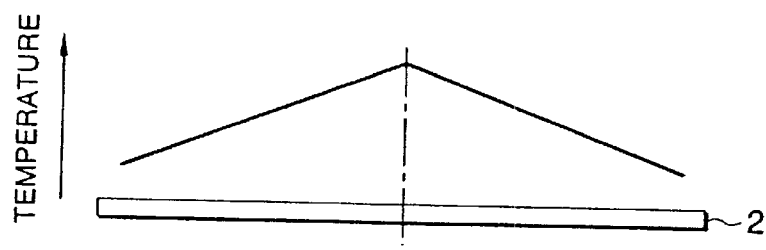
FIG. 4B is a graph showing a heating temperature distribution for a second heating conductor pattern continuously disposed.
Figure 4C:
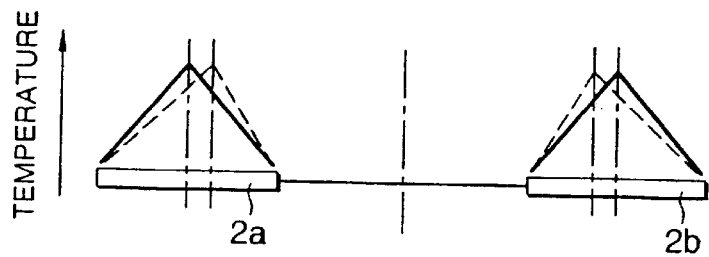
FIG. 4C is a graph showing a heating temperature distribution for second heating conductor patterns separately disposed.

FIGS. 4A–4C shows graphs of heating temperature distributions of the heaters shown in FIGS. 1A and 1B and 2A and 2B. The heater shown in FIGS. 1A and 1B includes a temperature distribution as shown in FIG. 4A for the first heating conductor pattern 1, and another temperature distribution as shown in FIG. 4B for the second heating conductor pattern 2. The heater shown in FIG. 2A, 2B includes the temperature distribution shown in FIG. 4A for the first heating conductor pattern 1, and temperature distributions as shown in FIG. 4c for the separate second heating conductor patterns 2a and 2b. The temperature distribution curves of FIGS. 4A and 4B are each configured to have an inverse V shape whose center corresponds to the center of the each heating conductor pattern.

The temperature distribution curves of FIG. 4C for the separate second heating conductor patterns are each configured to have an inverse V shape as indicated by a solid line. If required, the temperature distribution curves may be configured such that the top of the each inverse V shape is shifted toward the center as indicated by broken line. In the case of the circuit pattern such as shown in FIG. 3, such temperature distributions may be formed by varying the pitch of a series of letter U in the longitudinal direction.

Figure 5:
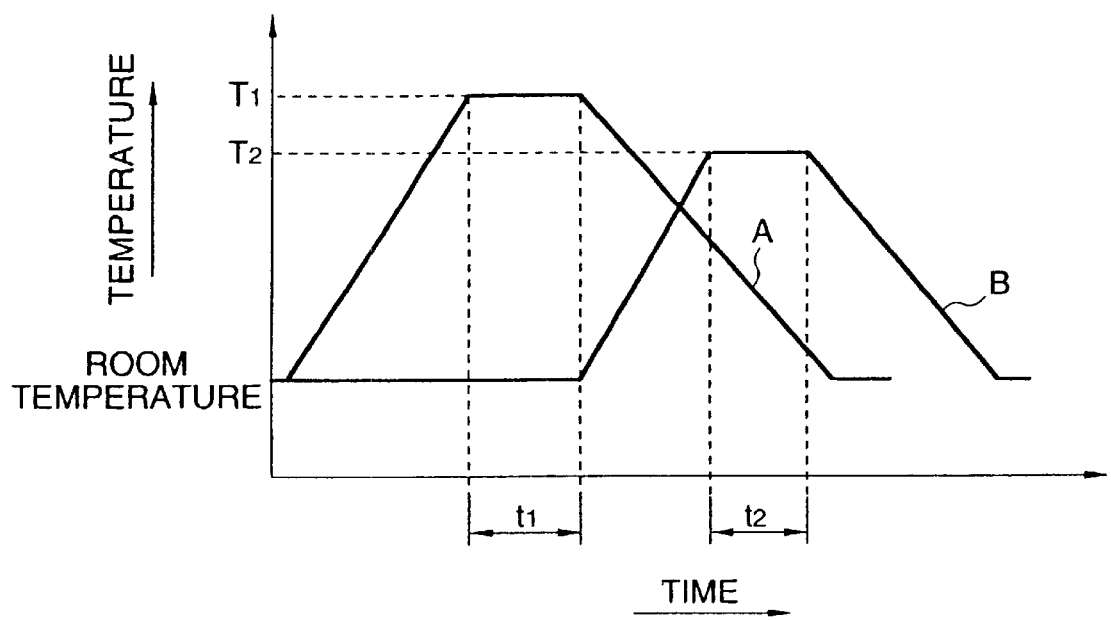
FIG. 5 is a graph showing temperature variation of the heating conductor patterns over a time range from the start of heating to the cooling.

FIG. 5 is a graph showing a model of temperature variations of the heating conductor patterns over a time range from the start of heating to the cooling. Temperatures in the graph of FIG. 5 represent temperatures detected at the positions of the first and second temperature sensors. That is, a solid line A in the graph represents a temperature of the first heating conductor pattern detected by the first temperature sensor and a solid line B represents a temperature of the second heating conductor pattern detected by the second temperature sensor. To start, an object to be heated is placed on the heater, and current is fed to the first heating conductor pattern. As time elapses, a temperature of the first heating conductor pattern rises, and the temperature detected by the first temperature sensor disposed at the central portion reaches a predetermined temperature T1. Then, the predetermined temperature T1 is kept for a predetermined time t1 by controlling the current fed thereto. Through the maintaining of the predetermined temperature of the first heating conductor pattern, the heating of the heater and the heated object disposed thereon gradually progresses from the center to both ends.

Thereafter, the feeding of current to the first heating conductor pattern is stopped, while at the same time feeding of current to the second heating conductor pattern is started. When the second temperature sensor of the second heating conductor pattern detects a preset temperature T2, the preset temperature T2 is kept for a preset time t2 by controlling the current fed thereto. As a result, a temperature of the first heating conductor pattern decreases, while a temperature of the second heating conductor pattern rises. At the overlapping parts of the first and second heating conductor patterns, the object to be heated is heated by the remaining heat of the first heating conductor pattern and the heat from the second heating conductor pattern. At the portion not overlapping, the object to be heated is heated by the heat from the second heating conductor pattern, and the heating further progresses toward both ends thereof.

The object may be gradually heated from the center towards both the ends by properly selecting the temperatures T1, T2 and times t1, t2 according to the size of the object. When a 40 mm long protective member is heated by use of the FIG. 2 heater, T1=190° C. T2=160° C. t1=30 seconds, t2=10 seconds. After the feeding of current to the second heating conductor pattern is stopped, an optical fiber fusion splicing part protected with the protective member, that is put on the heater, is taken out from the heater when the temperature decreases to a temperature which is suitable for handling it. Thus, at the beginning of the heating temperature quickly rises by concentrically heating the central portion of the heated object and then the temperature of the heated object quickly decreases by stopping heating the central portion thereof at the time when the both end portions thereof are heated. Accordingly, the whole heating time is remarkably reduced; the conventional heating time of 100 to 150 seconds is reduced to 70 to 120 seconds, that is, the whole heating time is reduced by about 20%.

Figure 6:
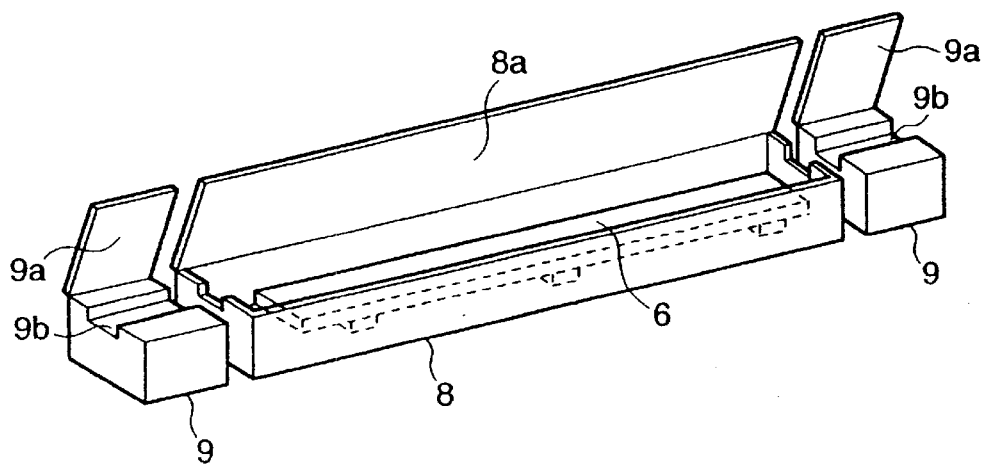
FIG. 6 is a perspective view showing a heating apparatus with a heater assembled thereinto.

FIG. 6 is a perspective view showing a heating apparatus with a heater assembled thereinto. Reference numeral 6 is a heater; 8, a heating chamber; 8a, a cover; 9, a clamping member; 9a, a holding plate; and 9b, a fiber receiving groove. A protective member, an object to be heated, covering an optical fiber fusion splicing part is placed on the heater 6 secured in the heating chamber 8. Coated optical fibers connecting to both ends of the optical fiber fusion splicing part are put in fiber receiving grooves 9b of clamping members 9 which are disposed next to the ends of the heating chamber, and holding plates 9a are closed to hold them. In this way, the object to be heated is reliably held on along the heater. A cover 8a is preferably used to close the heating chamber 8 to confine the heat within the heating chamber.

Current is fed to the heating conductor patterns contained in the heater 6, from a power supply (not shown) and a temperature control mechanism (not shown), and therefore the protective member placed on the heater 6 is heated by the heat of the heater 6. The protective member as the object to be heated is put on the heater in a state that it is in contact with the heater, in order to improve the heating efficiency. Therefore, the surface of the heater which is in contact with the protective member is preferably coated with fluorine plastic so as to prevent the protective member from sticking to the heater surface.

Figure 7:
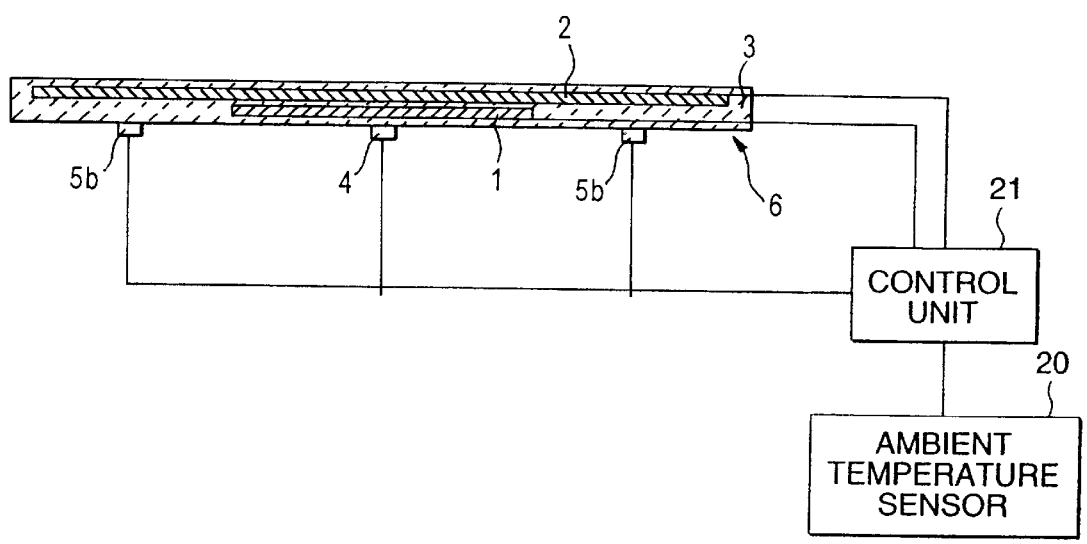
FIG. 7 is a block diagram showing a heating apparatus with an ambient temperature sensor and a control unit according to the present invention.
Figure 8A:
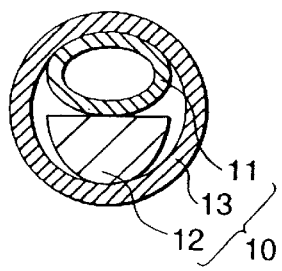
FIG. 8A is a cross sectional view showing a protective member used for an optical fiber fusion splicing part.
Figure 8B:
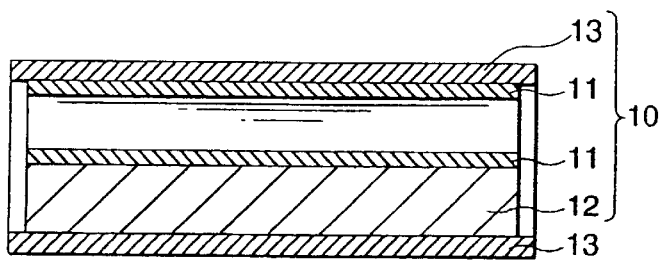
FIG. 8B is a longitudinal sectional view showing the protective member used for the optical fiber fusion splicing part.
Figure 9A:
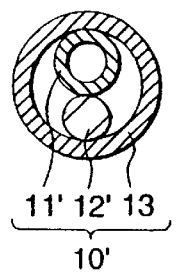
FIG. 9A is a cross sectional view showing another protective member used for an optical fiber fusion splicing part.
Figure 9B:
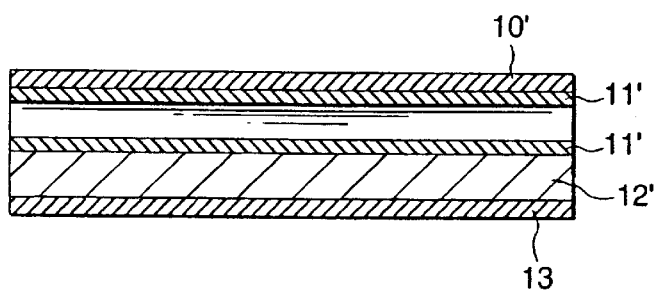
FIG. 9B is a longitudinal sectional view showing the another protective member used for an optical fiber fusion splicing part.
Figure 10A:
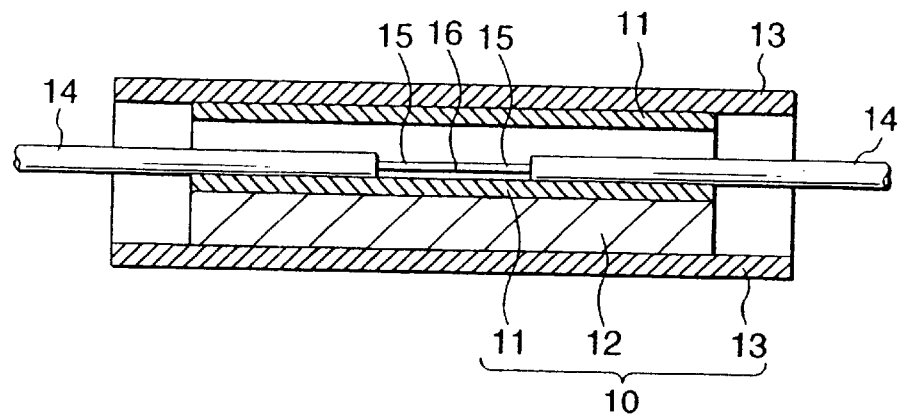
FIGS. 10A through 10C are longitudinal sectional views showing a working procedure to protect an optical fiber fusion splicing part with the protective member.
Figure 10B:
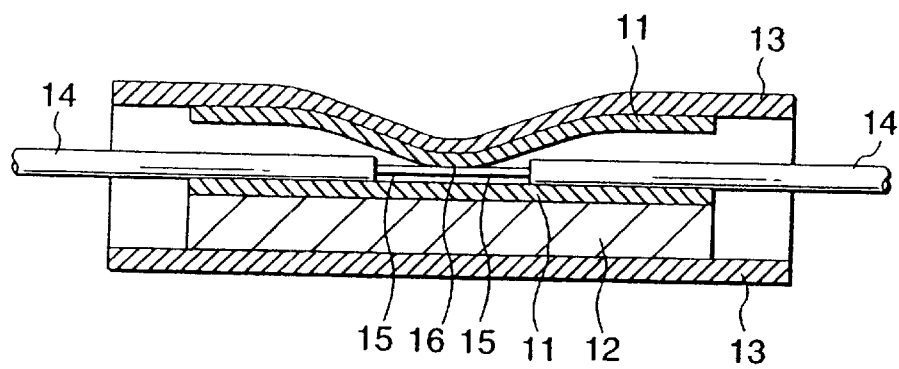
Figure 10C:
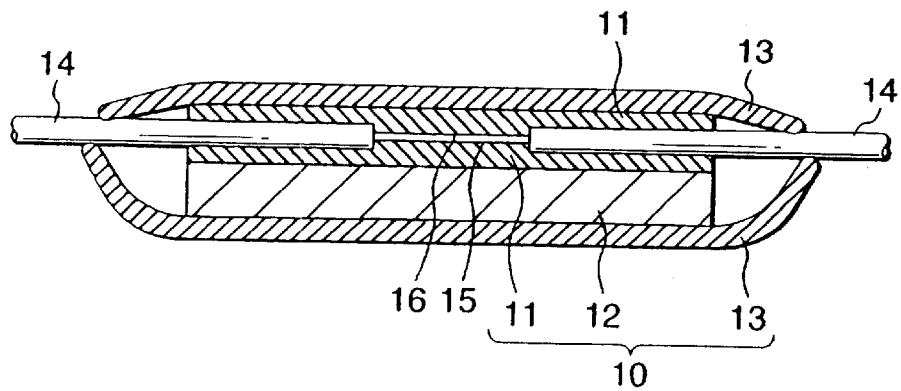
Figure 11A:
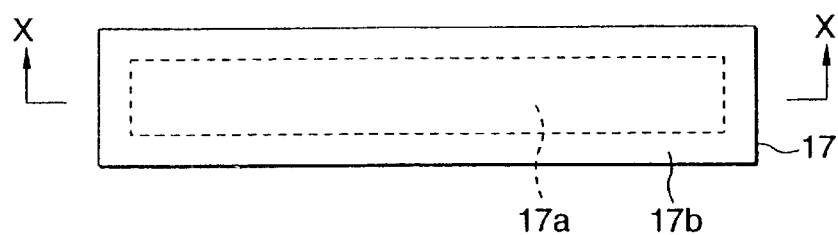
FIG. 11A is a plan view showing an embodiment of a heater of the heating apparatus which is used for heating the protective member.
Figure 11B:
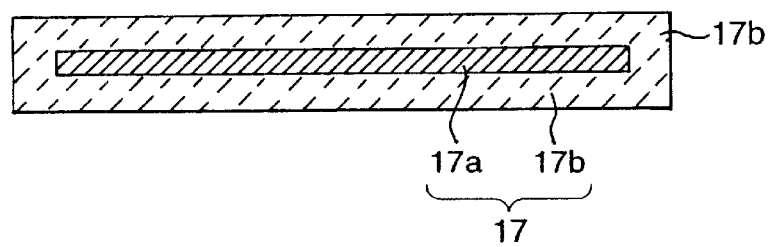
FIG. 11B is a longitudinal sectional view showing the heater of a heating apparatus taken on line X—X in FIG. 11A.
Figure 11C:
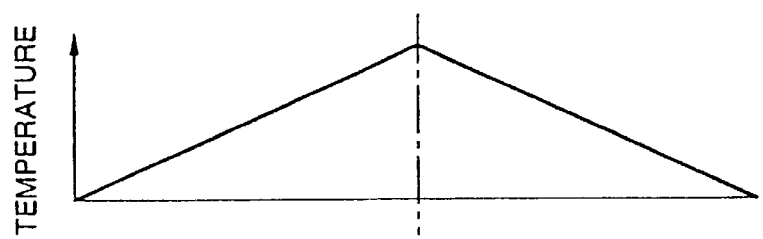
FIG. 11C is a graph showing a temperature distribution of the heater.

In the above-mentioned heating apparatus, if ambient temperature varies, the heater temperature will also vary sometimes even if a current fed to the heating conductor pattern is controlled to be kept the same value. To prevent influence of ambient temperature, an ambient temperature sensor 20, e.g., a thermistor, may be attached to a location being apart from the heater as shown in FIG. 7 to such an extent that it is not influenced by the heater temperature. A current fed to the heating conductor pattern is controlled, by a control unit 21, in accordance with an ambient temperature detected thereby so that heating temperatures of the heating conductor patterns are invariable irrespective of a variation of the ambient temperature. In this way, the heating of the protective member is made uniform independent of the ambient temperature. Further, if a relationship between ambient temperature and current fed to the heating conductor pattern is measured and recorded in advance, the current fed thereto may be controlled so as to attain a desired heating temperature by use of the recorded relation if an ambient temperature is known.

The present invention is based on Japanese Patent Application No. Hei. 11-182779, which is incorporated herein by reference.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A heating apparatus for heating a protective member which protects a fusion splicing part of optical fibers, said heating apparatus comprising:

a heater for application to said protective member, including a plate-shaped member which is made of heat-resistive and insulated materials and has an elongated shape extending in a longitudinal direction, a first heating conductor pattern disposed in a central portion of said plate-shaped member in the longitudinal direction, and a second heating conductor pattern disposed in both end portions of said plate-shaped member in the longitudinal direction, said first heating conductor pattern at least partially overlapping said second heating conductor pattern, wherein said first heating conductor pattern and said second heating conductor pattern are independently temperature controlled.

2. The heating apparatus in accordance with claim 1, wherein said second heating conductor pattern extends from one end portion of said plate-shaped member to the other end portion thereof in the longitudinal direction.

3. The heating apparatus in accordance with claim 1, wherein said second heating conductor pattern comprises two heating conductor patterns which are separately disposed in one end portion of said plate-shaped member and the other end portion thereof in the longitudinal direction while being close to both ends of said first heating conductor pattern.

4. The heating apparatus in accordance with claim 3, wherein said two heating conductor patterns are disposed symmetrical with respect to the center of the plate-shaped member.

5. A heating apparatus for heating a protective member which protects a fusion splicing part of optical fibers, said heating apparatus comprising:

a heater including a plate-shaped member which is made of heat-resistive and insulated materials and has an elongated shape extending in a longitudinal direction, a first heating conductor pattern disposed in a central portion of said plate-shaped member in the longitudinal direction, and a second heating conductor pattern disposed in both end portions of said plate-shaped member in the longitudinal direction, wherein said first heating conductor pattern and said second heating conductor pattern are independently temperature controlled; and wherein said second heating conductor pattern comprises two heating conductor patterns which are separately disposed in one end portion of said plate-shaped member and the other end portion thereof in the longitudinal direction while overlapping with said first heating conductor pattern.

6. The heating apparatus in accordance with claim 4, wherein said two heating conductor patterns are disposed symmetrical with respect to the center of the plate-shaped member.

7. The heating apparatus in accordance with claim 1, further comprising a first temperature sensor for detecting a temperature of said first heating conductor pattern, a second temperature sensor for detecting a temperature of said second heating conductor pattern, and a control mechanism which controls temperatures of said first and second heating conductor patterns separately on the basis of temperatures detected by said first or second temperature sensors respectively.

8. The heating apparatus in accordance with claim 7, further comprising an ambient temperature sensor disposed at such a position that said ambient temperature sensor is not affected by a temperature of said heater, wherein said control mechanism controls the temperatures of said first and second heating conductor patterns separately, on the basis of a temperature detected by said ambient temperature sensor in addition to the temperatures detected by said first or second temperature sensors respectively.

9. A heating apparatus for heating a protective member which protects a fusion splicing part of optical fibers, said heating apparatus comprising:

a heater including a plate-shaped member which is made of heat-resistive and insulated materials and has an elongated shape extending in a longitudinal direction, a first heating conductor pattern disposed in a central portion of said plate-shaped member in the longitudinal direction, and a second heating conductor pattern disposed in both end portions of said plate-shaped member in the longitudinal direction, wherein said first heating conductor pattern and said second heating conductor pattern are independently temperature controlled; and further comprising a heating chamber for securing said heater and clamping members disposed next to both ends of said heating chamber separately.

10. The heating apparatus in accordance with claim 9, further comprising a cover for closing said heating chamber to confine the heat within the heating chamber.

11. The heating apparatus in accordance with claim 1, wherein said plate-shaped member comprises a first plate-shaped member in which said first heating conductor pattern is disposed and a second plate-shaped member in which said second heating conductor pattern is disposed.

12. The heating apparatus in accordance with claim 11, further comprising a spacer, wherein said first and said second plate-shaped members, on which said first and said second heating conductor patterns are printed respectively, are arranged in parallel while said spacer is disposed therebetween.

13. The heating apparatus in accordance with claim 11, wherein said first and second plate-shaped members, in which said first and second heating conductor pattern are buried respectively, are combined to form said heater.

14. The heating apparatus in accordance with claim 1, wherein said first and second heat conductor patterns have the same resistance value.

* * * * *